(12) United States Patent
Guichard et al.

(10) Patent No.: US 7,602,778 B2
(45) Date of Patent: Oct. 13, 2009

(54) SYSTEM AND METHODS FOR COMPRESSING MESSAGE HEADERS

(75) Inventors: James N. Guichard, Groton, MA (US); Bruce S. Davie, Cambridge, MA (US); Eric C. Rosen, Arlington, MA (US); John J. Mullooly, Colts Neck, NJ (US); Gerhard Wieser, New York, NY (US)

(73) Assignee: Cisco Technology, Inc., San Jose, CA (US)

( * ) Notice: Subject to any disclaimer, the term of this patent is extended or adjusted under 35 U.S.C. 154(b) by 650 days.

(21) Appl. No.: 11/169,417

(22) Filed: Jun. 29, 2005

(65) Prior Publication Data

US 2007/0002850 A1 Jan. 4, 2007

(51) Int. Cl.
*H04L 12/28* (2006.01)
(52) U.S. Cl. ...................................... 370/389
(58) Field of Classification Search .................. 370/389
See application file for complete search history.

(56) References Cited

U.S. PATENT DOCUMENTS

| | | | | |
|---|---|---|---|---|
| 6,041,054 | A * | 3/2000 | Westberg | 370/389 |
| 6,314,095 | B1 * | 11/2001 | Loa | 370/352 |
| 6,711,164 | B1 * | 3/2004 | Le et al. | 370/392 |
| 6,751,209 | B1 | 6/2004 | Hamiti et al. | 370/349 |
| 6,967,930 | B2 * | 11/2005 | Burmeister et al. | 370/253 |
| 2001/0030963 | A1 | 10/2001 | Yoshimura et al. | 370/393 |
| 2003/0225914 | A1 | 12/2003 | Gazier et al. | 709/247 |
| 2004/0081151 | A1 | 4/2004 | Greis et al. | 370/392 |
| 2005/0041660 | A1 | 2/2005 | Pennec et al. | 370/389 |
| 2005/0055464 | A1 | 3/2005 | Weller | 709/247 |

OTHER PUBLICATIONS

Ash et al., Header Compression over MPLS, Mar. 2005, all pages, http://www.ietf.org/proceedings/05mar/slides/avt-6.pdf.*
Ash et al., Requirements for Header Compression over MPLS, Jun. 2004, all pages, http://tools.ietf.org/html/draft-ietf-avt-hc-mpls-reqs-03.*
Supplementary European Search Report for corresponding case PCT/US2006/025331 dated Jun. 15, 2009.
Berger et al., "MPLS/IP Header Compression," draft-ietf-mpls-hdr-comp-00.txt, IETF Standard-Working-Draft, Internet Engineering Task Force, IETF, Ch., vol. mpls, Jul. 1, 2000.
Thompson et al., Tunneling Multiplexed Compressed RTP, draft-ietf-mpls-avt-tcrtp-08.txt, IETF Standard-Working-Draft, Internet Engineering Task Force, IETF, Ch., vol. avt, No. 8, Sep. 01, 2004.

* cited by examiner

*Primary Examiner*—Chirag G Shah
*Assistant Examiner*—Otis L Thompson, Jr.
(74) *Attorney, Agent, or Firm*—Brinks Hofer Gilson & Lione (57) ABSTRACT

An MPLS router operable for labeled switch path (LSP) operation defines a compression index for identifying a decompression context between other MPLS LSP routers. The compression index allows a multipoint-to-point link between MPLS routers, thereby avoiding an exhaustive mesh of point-to-point links between each of the MPLS routers. The originator ID identifies each of the multipoint originating endpoints at a common destination, and maintains the context of each compressed header to match incoming compressed headers to the corresponding header values. The originator ID, typically the IP address of the originator, operates as the compression index on the multipoint-to-point connection, operable to distinguish multiple originators of the multipoint-to-point connection and provide header compression for each.

23 Claims, 7 Drawing Sheets

SYSTEM AND METHODS FOR COMPRESSING MESSAGE HEADERS

BACKGROUND

In a typical Virtual Private Network (VPN), a plurality of customer networks, such as LANs, or other user-site based arrangements, interconnect via a core network to provide each subnetwork with the appearance of sharing a common network with each of the other LANs. Each LAN, or subnetwork, has one or more gateway nodes, or customer edge (CE) routers, through which traffic egressing and ingressing to and from the LAN passes. The gateway nodes connect to a network service provider router, or provider edge (PE) router, at the edge of the core network, operable to provide transport to the other subnetworks in the VPN. The CE and PE routers are referred to as "edge" routers due to their proximity on the edge of a customer or provider network. The core network, which may be a public access network such as the Internet, a physically separate intranet, or other interconnection, provides transport to remote PE routers. The remote PE router couples to a remote CE router representing the ingress to a remote subnetwork, or LAN, which is part of the VPN. The remote CE router performs forwarding of the IP traffic to the destination within the remote VPN (LAN) subnetwork.

Conventional VPNs are particularly well suited to the advantages provided by Multi-Protocol Label Switching (MPLS) networks. A major feature of MPLS is its ability to place IP traffic on a particular defined path through the network as specified by the label. Such path specification capability is generally not available with conventional IP traffic. In this manner, MPLS provides separation between the routing and addressing of different VPN customers, and is discussed further in Internet Engineering Task Force (IETF) RFC 2547, concerning Virtual Private Networks (VPNs, or "2547" networks).

Accordingly, MPLS networks are particularly suited to VPNs because of their amenability to forwarding the traffic of multiple customers in a secure manner over service provider networks. Such MPLS networks, therefore, perform routing decisions based on path specific criteria, designating not only a destination but also the intermediate routers (hops), rather then the source/destination specification in IP which leaves routing decisions to various nodes and routing logic at each "hop" through the network.

SUMMARY

In a core network such as an MPLS network supporting a VPN environment, an interconnection of routers define a path through the core network from edge routers denoting the ingress and egress routers (points). Provider edge (PE) routers at the edge of the core network connect to customer edge (CE) routers at the ingress/egress to a customer network, such as a customer subnetwork. The path through the core network may include many "hops" through provider (P) routers in the core from an ingress PE router to the egress PE router. In an MPLS network, such as discussed further below, Label Switched Paths (LSPs) are often employed. The LSPs effectively define a link between a source and destination that identifies a particular routing path, as an alternative to IP routing which specifies the destination, but not the intermediate path, or "hops."

Customers of an MPLS VPN service may want to compress the packet headers of the traffic (an example of which is voice traffic) so as to utilize the available bandwidth of their access links in a more efficient manner. Taking voice as an example, this compression has traditionally been performed on the CE-PE links, using the facilities of Compressed Real-Time Protocol (cRTP). This puts an unnecessarily high processing burden on the PE routers if a large number of CE-PE links all wish to run cRTP. Furthermore, packets traversing the service provider network (e.g. core network) need to be decompressed on ingress to the network (CE-PE direction) and compressed at the egress (PE-CE direction). Not only does this imply double compression & decompression between CE routers is necessary, but also implies that the service provider core does not benefit from any compression gains.

In general, conventional packet switched networks often employ header compression to mitigate redundancy in a transmitted sequence of packets, thereby reducing the total transport volume. In particular, header compression involves identifying information which is either static (i.e. will not change) or which changes predictably (i.e. in a deterministic manner). Conventional header compression techniques identify information in such recreatable fields, transmit it a single time, strip the recreatable information from successive messages, and reassemble the full header from the status values and/or deterministic fields at the receiver. Examples of such fields include a destination IP address, which is the same for each packet in the sequence, and a sequence number, which increments by one for each packet. One particular type of header compression discussed in an exemplary manner herein is cRTP header compression. Other mechanisms may be employed.

Conventional header compression, such as Compressed Real-Time Protocol (cRTP), however, employs compression on a per link basis, i.e. on a single hop between specific routers. One reason for this approach is that conventional IP routing mechanisms employ routing table lookups at each hop, and must therefore recreate the header to obtain the IP routing information for successive hops. Therefore, conventional header compression using compression mechanisms such as cRTP may decompress at multiple hops to access the IP destination. Conventional MPLS networks, however, employ label forwarding, as indicated above, using the MPLS label in the message rather than the IP destination address. Such decompression at multiple routing hops, therefore, unnecessarily mitigates the advantage of LSP routing because of the CPU resources required for successive compressions and decompressions, since LSP routing does not need to access the IP address information.

One conventional approach, in a typical CE--PE--CORE--PE--CE context common in MPLS networks, compresses packets that are sent between the CE-PE hops, and performs decompression at the ingress PEs, therefore sending decompressed packets through the core. It would be beneficial, therefore, to transmit the compressed packet from the CE to CE routers, maintaining the compression across the core network, using a labeled switch path (LSP) which avoids the need to decompress the packet as it enters the core of the network to obtain routing information.

A particular conventional approach is to perform compression over a CE-CE MPLS LSP. Such an approach, which may be implemented according to details in RFC 2508, entitled "Compressing IP/UDP/RTP Headers for Low-Speed Serial Links," and RFC 2509, requires a full mesh of CE-CE LSPs, so that the appropriate decompression context can be established at the far end CE. However, a full mesh of CE-CE LSPs is undesirable because it may lead to a very large number of LSPs being established. Furthermore it forces the CEs to perform complex routing decisions to select the appropriate LSP, thus undoing one of the major benefits of MPLS VPNs.

Configurations discussed herein substantially overcome the above described shortcomings of conventional header compression in MPLS networks by defining an originator ID, for identifying a decompression context between routers. The originator ID effectively allows a multipoint-to-point LSP between routers, thereby avoiding an exhaustive mesh of point-to-point LSPs between each of the routers. The originator ID identifies each of the multipoint originating endpoints, and enables the recipient of each compressed header to maintain context information that is necessary to match incoming compressed headers to the corresponding header values. Therefore, the recipient maintains a separate set of header context for each originator ID so as to match incoming packets with the proper header information. Note that where multiple streams emanate from the same originator, the context ID is also employed to distinguish and provide a compression index to the header context. The originator ID, typically the IP address of the originator, therefore operates as a deterministic identifier on the multipoint-to-point connection, operable to distinguish multiple originators of the multipoint-to-point connection and provide header compression for each.

Accordingly, label switch routers may take advantage of LSP switching (transport) through the core MPLS network by maintaining the same compressed header across multiple LSP hops, and decompressing the sequence of packets at the receiving router by employing the originator ID to identify the corresponding header context. Exemplary configurations herein therefore employ a label switched path (LSP) between CE routers connected by a service provider MPLS network. One particular implementation is a so-called carrier's carrier service (CSC) discussed in RFC2547bis referenced above.

Conventional mechanisms, employing only a context ID to reference header fields, may risk a collision of context IDs using a multipoint approach, in which multiple originators employ the same context ID. By employing the originator ID of the originator, such as the IP address, a unique value (key) is associated to the compression context and employed as a compression index to identify each of a sequence of packets emanating from a source, and to distinguish the sequence of packets from other sources over the multipoint-to-point LSP via the compression index. The originator ID, therefore, provides the compression index over the multipoint-to-point LSP from each originating router to the destination router. Further, for multiple transmissions from the same originator, a combination of the originator ID and context ID may be employed for the compression index. Such a combination deterministically identifies the proper header context from among other header contexts (from the same or different routers) to enable proper decompression upon receipt. The receiver (decompressor) receives compressed packets with the context ID and originator ID, collectively the compression index, that allows the receiver to reference the correct context table and recreate (i.e. decompress) the correct packet information corresponding to the compressed header information.

For some types of traffic, the header size can be a substantial portion of the entire packet. For example, some types of voice traffic (i.e. VOIP) have small packet payloads and employ headers that are larger than the payload itself. Further, a smaller payload size implies a larger number of packets to transport a particular message volume (size). Therefore, traffic tending to promote smaller payloads increases the number of headers and therefore the overhead for dealing with header compression for the packet sequence.

In further detail, the method for transporting message packets discussed herein includes compressing a message header of a message in a set of messages, in which the compression is operable for identifying deterministic fields recreatable in successive messages, and for determining a context ID indicative of the compressed message header. The sender determines an originator ID, in which the originator ID is indicative of the originator of the set of messages, such as the IP address of the originator. The sender appends the originator ID to each of the messages in the set, and sends a first message of the set, in which the first message includes the originator ID and corresponding header fields. The sender then sends successive messages of the message set with only the originator ID, such that the originator ID is operable to indicate the originator of the message and the compression header context, thereby enabling correlation of the message packets with the corresponding header context.

In the exemplary configuration, the network is an MPLS network in which the receiver receives a compression label from a destination, such that the label is indicative of the compressed nature of the header, and appends the label to each of the messages in the compressed message set. Determination of the originator ID further includes determining the compression label corresponding to a multipoint-to-point LSP, in which the originator ID is operative to identify a source of the multipoint-to-point LSP and the determined label is operable to indicate the routing path along the multipoint-to-point LSP, as is typical in LSP routing mechanisms. Such LSP routing allows omission of a destination based header field from the message header, since the destination based header field is operable for destination based routing and instead forwards the packet based on the label field, in which the label is indicative of particular router hops independent of the destination. Sending the messages is via a labeled path indicative of the recipient of the multipoint-to-point LSP, in which the labeled path is operable with a predetermined protocol, such as LDP, adapted for identifying a routing path.

In the exemplary configuration, therefore, the method provides for sending messages having compressed message headers, includes assembling a compressed message header having an originator ID corresponding to the sender of the message, and sending the message via a multipoint-to-point LSP, in which the originator ID is operable to distinguish the sender of the message from other senders over the multipoint-to-point LSP. The receiving router, such as the receiving CE router, decompresses the message header of the message using the originator ID, in which the originator ID coupled with the context ID is indicative of a decompression context applicable to the set of messages.

Compressing the message headers further involves identifying compressible header fields in the message header, and associating the compressible header fields with a context ID. The compressible fields are those that either do not change, or change in a predictable manner, thus enabling a deterministic mechanism for recreating the header. The sender therefore identifies a set of messages adapted for header compression via a compression context, wherein sending the message further includes sending the message with a context ID corresponding to the compression context, in which the context ID and originator ID are operable to distinguish the set of messages in the compression context from other messages. The sender further inserts a compression label indicative of the compressed nature of the header, in which the compression label is recognizable by the receiver and the receiver is responsive to the compression label for performing header decompression.

In particular configurations, an additional field corresponding to the compression label may further identify a particular type of compression to be performed, such that the sender selectively appends a particular compression label based on the type of compression to be performed. Accordingly, exemplary configurations of the method of compressing message headers over a multipoint-to-point LSP as disclosed further below include identifying a set of messages adaptable for header compression, in which adaptable messages have headers with deterministic information predictable from a predecessor message in the set of messages. The sender associates the deterministic information with a context ID, in which the context ID is indicative of the header information for each of the messages in the set of messages, and appends the context ID to each of the messages in the set of messages. The sender further inserts an originator identifier, indicative of the sender of the message, in a message header having the context ID, such that the combination of the originator identifier and the context ID are operable to distinguish the sender from other senders operable on the multipoint-to-point LSP to the destination.

Alternate configurations of the invention include a multi-programming or multiprocessing computerized device such as a workstation, handheld or laptop computer or dedicated computing device or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a computer-readable medium including computer program logic encoded thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM or RAM or PROM chips, field programmable gate arrays (FPGAs) or as an Application Specific Integrated Circuit (ASIC). The software or firmware or other such configurations can be installed onto the computerized device (e.g., during operating system for execution environment installation) to cause the computerized device to perform the techniques explained herein as embodiments of the invention.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Conventional approaches to header compression in a typical MPLS based CE-PE-CORE-PE-CE context compress and decompress between each of the CE-PE (edge router) hops, therefore sending decompressed label switched packets through the core. It would be beneficial, therefore, to transmit the compressed packet from CE to CE routers, maintaining the compression across the core network, using labeled switch path (LSP) forwarding which avoids the need to decompress the packet to obtain routing information, since the CE LSP label is available in the compressed packet.

Accordingly, configurations herein describe a method to transport cRTP (i.e. compressed) packets over an MPLS network between CE devices without the necessity of deployment of cRTP on the PE-CE LSPs. An existing label switched path is employed between CEs as provided by the so-called Carrier's Carrier (CsC) architecture, as is known in the art. Unlike conventional mechanisms, this approach does not require a full mesh of point-to-point LSPs among the CEs. In CsC, multipoint-to-point LSPs are established. The proposed method takes the approach of using a specific local MPLS label value between a pair of CEs that is used to identify incoming packets as carrying cRTP traffic. In addition to this label, a tag identifies the source of the packets via the originator ID (an additional identifier) and the packet type (full header, compressed RTP, compressed UDP, context state, etc.) to point to the correct upper layer process as mandated by RFC2508, cited above, concerning conventional mechanisms for header compression, as is known in the art. The originator ID, is inserted by the compressor CE (originator) between the compressed headers and the next label(s) in the stack. This ID is used to identify the compressor (CE router). The receiving CE can use the information within the originator ID tag to identify the compressor and can thereby correlate the incoming cRTP context ID with the correct context ID in the decompressor's context tables.

Configurations below define an originator ID for identifying a decompression context between MPLS routers. The originator ID allows a multipoint-to-point LSP between MPLS routers, thereby avoiding an exhaustive mesh of point-to-point LSPs between each of the MPLS routers. The originator ID identifies each of the multipoint originating endpoints at a common destination, and maintains the context of each compressed header to match incoming compressed headers to the corresponding header values. Further, in the case of multiple compressed streams from the same originator, the combination of the context ID and the originator ID, operates as the compression index on the multipoint-to-point connection, and is operable to distinguish multiple originators of the multipoint-to-point connection and provide header compression for each.

In the exemplary configuration, the originator ID is included in a compressed MPLS header, along with other header fields as now described in further detail. This new header field (referred to as an originator ID below) is included along with a specific local MPLS label value between a pair of CEs that is used to identify incoming packets as carrying compressed (cRTP) traffic (referred to as a compression label below). In conjunction with the compression label, the originator ID identifies the source of the packets. Another tag field identifies the packet type (full header, compressed rRTP, compressed UDP, context state, etc.) to point to the correct upper layer process as specified by RFC 2508. The new originator ID field is inserted by the compressor CE between the compressed headers and the successive labels in the stack to identify the originating CE router by IP address. Therefore, the exemplary compressed header includes the following fields, as shown in FIG. 1:

- CE label (134-1)—the routing label employed by the MPLS/LSP routing mechanism utilize by the exemplary configuration discussed herein.
- context ID (134-4)—this is called the Context identifier of CID in RFC2508, and retains this standard term in the exemplary arrangement. An alternate term is a cRTP header. As indicated above, conventional arrangements may employ the context ID for associating a set of header compressed packets. The exemplary configuration may also employ the context ID to distinguish multiple sets of compressed headers from the same originator, hence bearing the same originator ID.
- originator ID—(134-3) identifies the source of the compression. In the exemplary configuration, this field is the IP address of the originating (i.e. compressor) CE router, however other values indicative of the compressor could be used.
- compression label (134-2)—this field is the label that is advertised from receiver to sender (compressor CE router) that indicates that the receiver can handle compression. The sender knows to use this label when sending compressed packets. The sender then applies this label to all the compressed packets before sending them.
- packet type indicator (134-6)—this is analogous to the PPP protocol field values defined in RFC2509, and identifies the header 134 as one of an uncompressed header, a compressed TCP header, compressed RTP, etc. In the exemplary configuration, this information is inside the MPLS label stack entry that carries the compression label 134-2, in the place where a conventional TTL may occupy, because there is no need for a TTL in the exemplary configuration.

Figure 1:
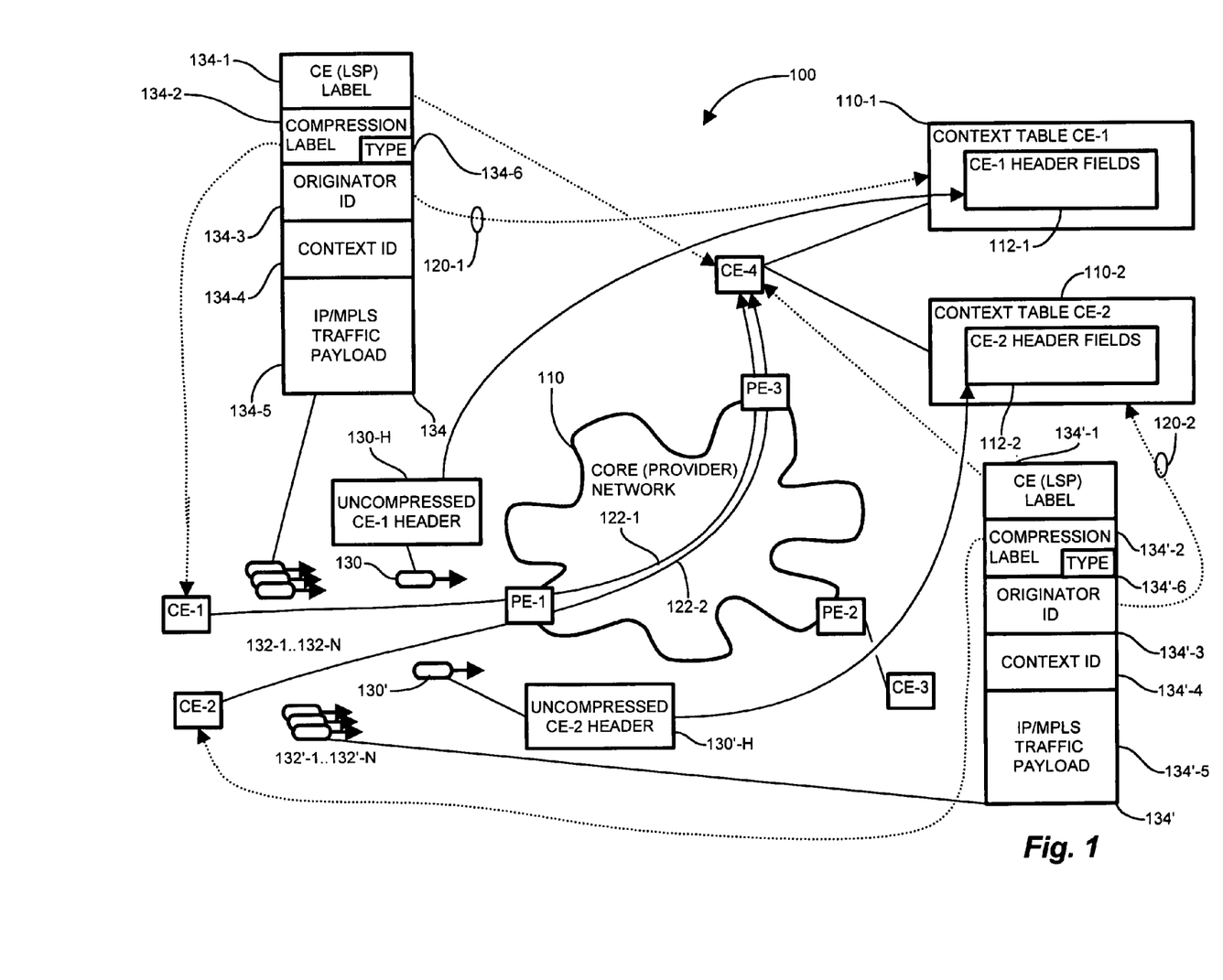
FIG. 1 is a context diagram of a network communications environment depicting a Virtual Private Network (VPN) over a MPLS core network.

FIG. 1 is a context diagram of a network communications environment depicting an exemplary Virtual Private Network (VPN) over an MPLS core network suitable for use with the compressed header 134 discussed above. Referring to FIG. 1, an MPLS environment 100 includes a plurality of customer edge routers CE-1 . . . CE-4 (CE generally) and a plurality of provider edge routers PE-1 . . . PE-3 (PE generally) interconnected by a core network 110, which may be an MPLS network operable for LSP routing, as in the exemplary configuration.

The CE-1 and CE-2 routers each send a sequence of message packets, shown by arrows 122-1 and 122-2, respectively (122, generally). In accordance with configurations herein, each of the message packet sequences 122 first sends a message 130, 130' including an uncompressed header 130-H, 130'-H, respectively, with pertinent header fields. The receiving router CE-4 retrieves the fields from the uncompressed header 130-H, 130'-H and stores the header fields 112-1, 112-2 in a respective context table 110-1, 110-2. The routers CE-1, CE-2 next send the remaining message packets 132-1 . . . 132-N, 132'-1 . . . 132'-N with the respective compressed header 134, 134'.

Each of the compressed headers 134, 134' includes compressed header fields 134-N, 134'-N. The compressed headers 134, 134' each include the CE (LSP) label 134-1, 134'-1, which is the LSP label for routing through the core network to CE-4, and a compression label 134-2, 134'-2, used to indicate to the receiving router that cRTP decompression is to be performed. In alternate configurations, this field may indicate whether decompression is to be performed at all, or alternate types of decompression to perform. Further, it may also comprise a static global flag to indicate the compressed nature of the payload and the need to perform decompression. The header 134, 134' also includes the originator ID, 134-3, 134'-3, and the context ID 134-4, 134'-4. The context ID 134-4, 134'-4 is generated by the originator CE for identifying successive packets 132, 132' in the sequence of packets sharing a compressed header 134, 134'. The originator ID 134-3, 134'-3 identifies the originator CE-1, CE-2 and forms the compression index 120-1, 120-2 that identifies the context table 110-1, 110-2, respectively, and associated header fields 112-1, 112-2. Since the context ID 134-4, 134'-4 is assigned by the originator CL, the compression index 120 identifies the context table 110 from among multiple originators CL-1 . . . CL-N of the multipoint LSP defined by 122. The originator ID, therefore, is an identifier that is specific to the sender CL, such as an IP address or other distinguishing value.

Each of the packets 134, 134' also includes a payload 134-5, 134'-5. The receiving CE-4 correlates the compression index 120 for each payload with the header fields 112 from the corresponding context table 110 to decompress the headers and regenerate the original packets.

Figure 2:
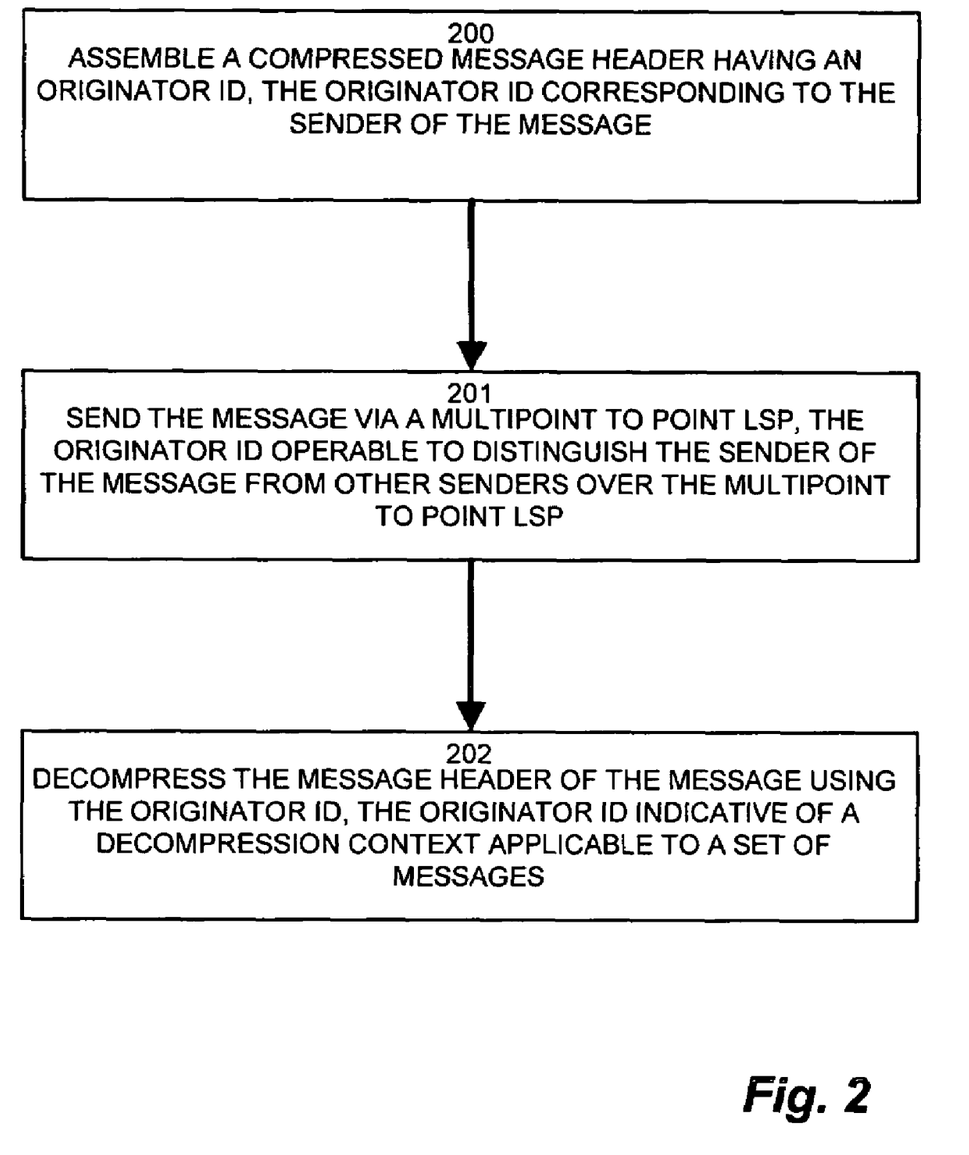
FIG. 2 is a flowchart of header compression in the network of FIG. 1.

FIG. 2 is a flowchart of header compression in the network of FIG. 1. Referring to FIGS. 1 and 2, the method for sending messages having compressed message headers disclosed herein includes assembling a compressed message header 134, 134' having an originator ID (originator ID) 134-3, 134'-3, in which the originator ID corresponds to the sender of the message, as depicted at step 200. In the exemplary configuration shown, the originator ID is the IP address of the originator, or sending router CE-1, CE-2. Other identifiers may be employed to distinguish particular senders CE-N over the multipoint-to-point LSP 122.

Employing the communication from CE-1 in an exemplary manner, the originator CE-1 sends the messages (packets) via the multipoint-to-point LSP 122, in which the originator ID is operable to distinguish the sender 134 from messages from other senders (CE-2) over the multipoint-to-point LSP 122, as shown at step 201. As indicated above, compression applies to a set of messages 132, or packets, defining a transaction or stream. Header information 130-H is transmitted a single time, typically with the first message 130 of the set of messages. Successive messages 132, 132'132' employ only the compressed header having the originator, or originator ID 134-3.

The receiving router CE-4 stores information from the message header 130-H of the message, as well as the originator (path) ID 134-3, in which the originator ID is indicative of a decompression context applicable to the set of messages 132, as depicted at step 202. The originator ID 134-3, or originator ID containing the IP address of the originator forms the compression index 120-1 operable as an index, or key, to the context table 110-1 containing the corresponding header fields 112-1. Accordingly, the complete set of messages 132 (packets) including full header information is recreatable at CE-4. In this manner, the compression index 120-1 deterministically identifies the header fields 112-1 for messages 132 transported via the multipoint-to-point LSP defined by 122. Further, if multiple sets of header compressed packets (streams) emanate from the same originator, the context ID 134-4, 134'-1 generated by the sender CE-1, CE-2 as part of the header compression, is used in combination with the originator ID 134-3, 134'-3 to avoid collisions of the originator ID.

Figure 3:
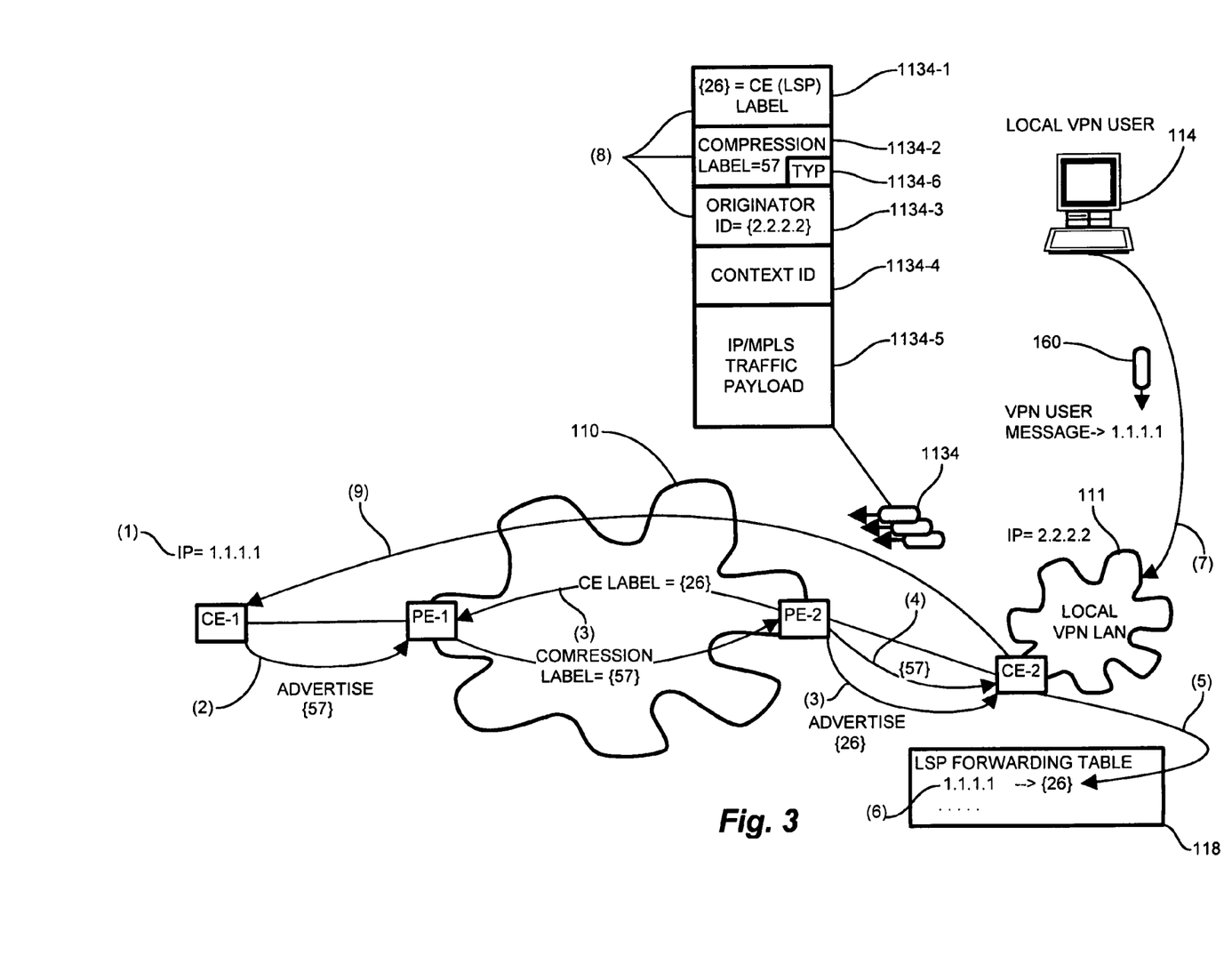
FIG. 3 is an example of applying header compression to a sequence of packets in the network in FIG. 1.
Figure 4:
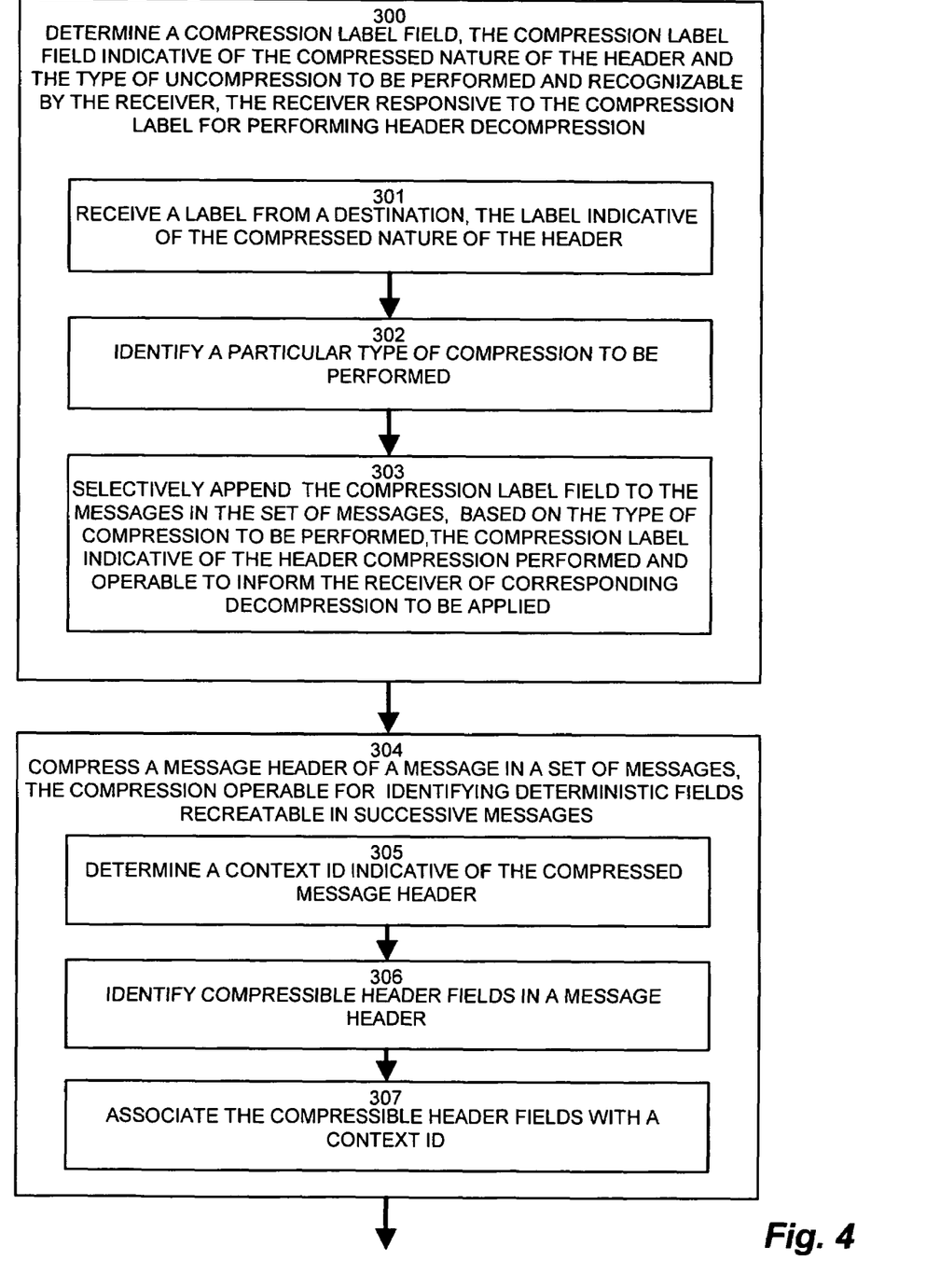
FIGS. 4-7 are a flowchart in further detail of header compression for a sequence of messages (packets).
Figure 5:
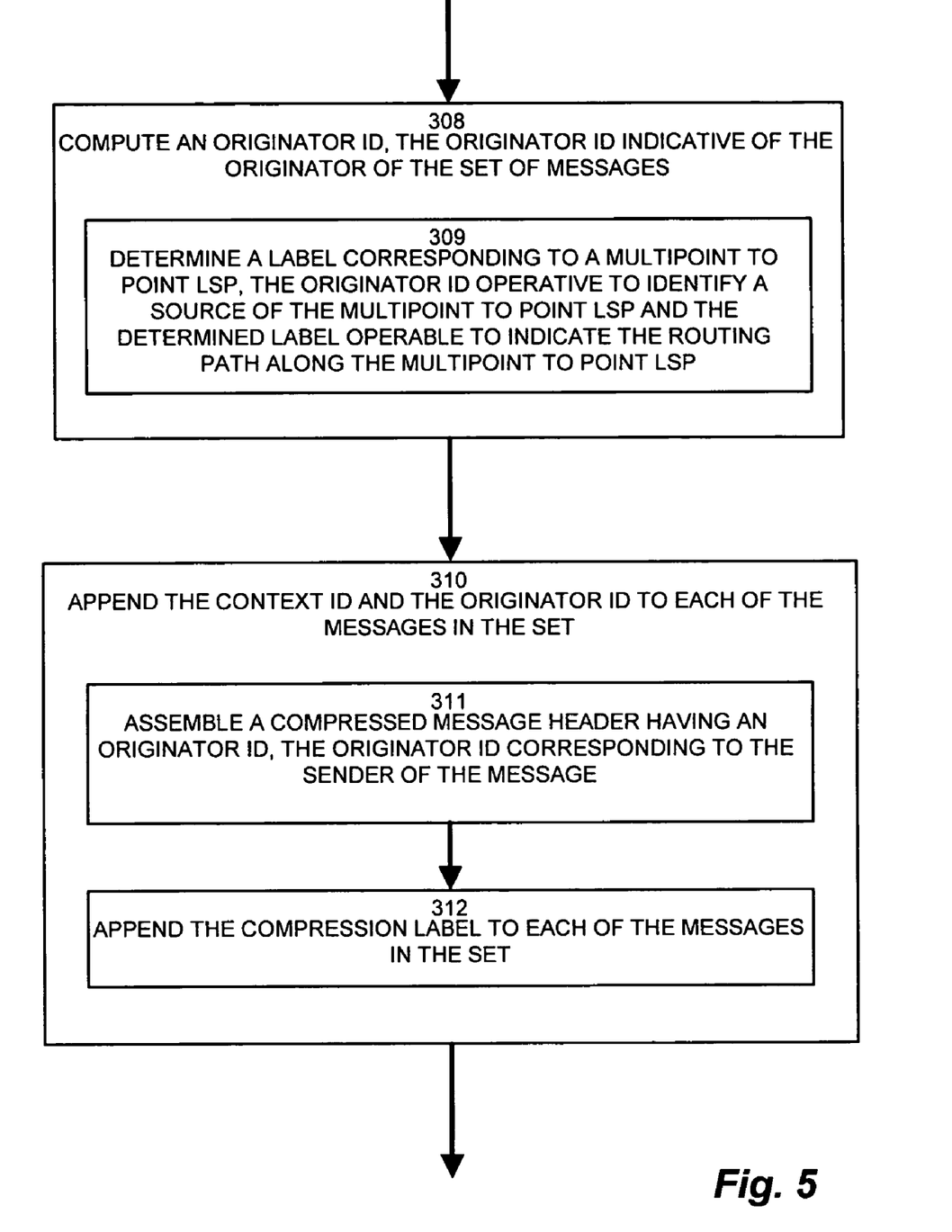
Figure 6:
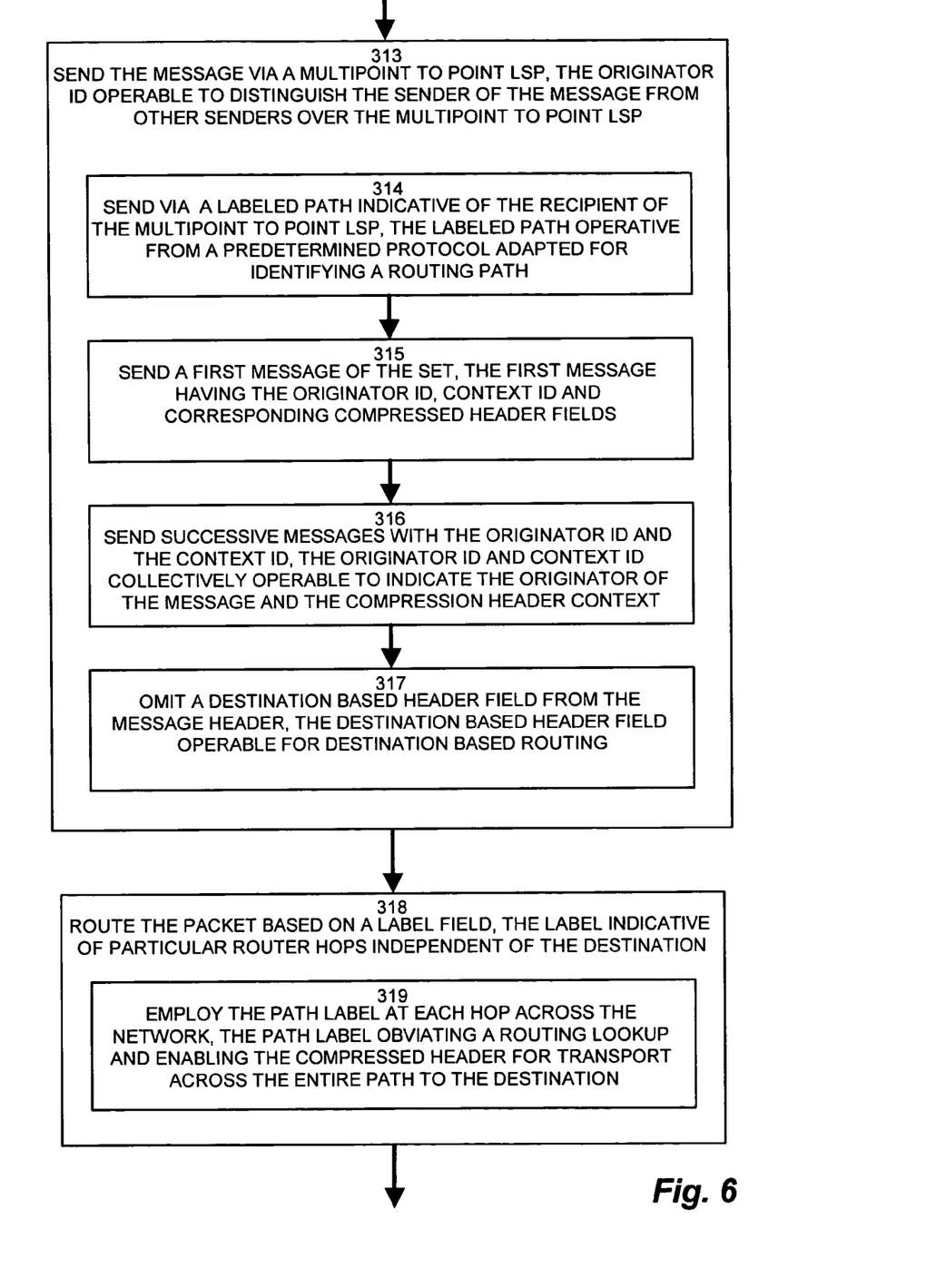
Figure 7:
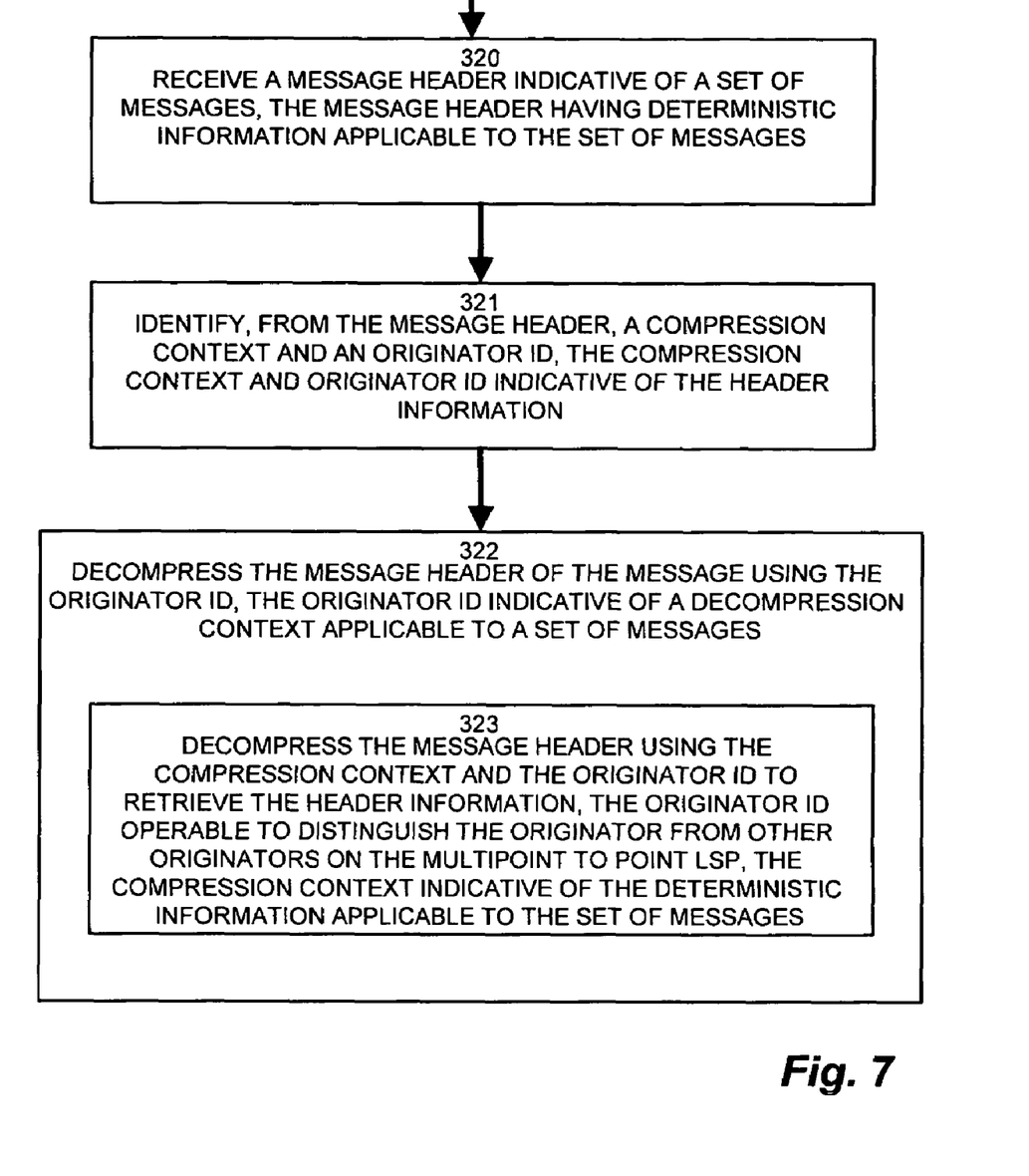

FIG. 3 is an example of application of header compression to a sequence of packets 132 in the network as in FIG. 1. Referring to FIG. 3, a network diagram is shown, depicting CE-1 and CE-2 served by PE-1 and PE-2 respectively. In this example, the core network 110 employs CsC (Carrier's carrier, in which a service provider operates as the transport agent for another service provider). The core network 110 also employs the Border Gateway Protocol (BGP) among the edge routers PE-N, CE-N, as is known in the art, for inter-router communication.

A more detailed summary of the operation of this functionality follows. Consider the case where the customer sites may not use MPLS internally. (1) Each CE advertises its local/32 IP address to the PE using BGP (IPv4+label–RFC 3107) (for illustration assume that CE-1 has address 1.1.1.1/32). In this case the advertised label is implicit null. This is normal CsC operation.

(2) If a CE is capable of compression/decompression it allocates a local label which will be used in the data plane to context switch incoming packets to cRTP (or other compression mechanism) for processing. This label is encoded within an extended-community attribute (referred to as the "CE-CE cRTP Informational" attribute). This label is advertised via the Border Gateway Protocol (BGP) to the attached PE (PE-1) along with the CE address and normal CsC label of step (1). The content of this attribute includes the label that all other cRTP capable routers are to use when sending cRTP packets towards the advertising CE router, referred to as the compression label (or cRTP label). A remote CE receiving such an advertisement will infer that (a) the CE that originates the advertisement is capable of implementing the new cRTP mechanism described herein (b) the originator ID of that router is the same as the prefix address carried within the BGP update. For illustration purposes, assume that the CE-1 allocates a label value of {57} to be used as its compression label.

(3) The PE routers in the service provider network 110 behave in a typical CsC manner to establish LSPs from CE to CE. Thus, for example, PE-1 is connected to CE-1, so it allocates a VPN label for CE-1 and advertises it to the other PEs using MP-BGP. So PE-2 has a VPN label to get to CE-1. PE-2 also allocates a label for CE-1 and advertises it to CE-2 via BGP. In the example shown, that label is {26}.

(4) In addition to the labels they receive from PEs, each CE receives the extra label advertised in step (2) from each other cRTP capable CE. So, CE-2 receives label {57} from PE-2 in the "CE-CE cRTP Informational" attribute along with the "normal" label received in step (3).

(5) The receiving CE (CE-2) populates its forwarding table 118 to indicate that if it sends a packet toward 1.1.1.1 it should use label 26 for all traffic. In addition, the route to CE-1 carries the "CE-CE cRTP Informational" extended-community attribute, so if CE-2 is able of supporting compression/decompression, it uses the information from the attribute to inform the cRTP process of the compression label for CE-1 (57).

(6) As this is a CSC environment the receiving CE (CE-2) will have learned remote prefixes that are reachable via CE-1 directly and therefore the next-hops are the remote CE (CE-1) with IP address 1.1.1.1/32.

(7) When CE-2 receives a packet 160 directed toward a destination which is reachable via CE-1, such as the local VPN user 114 connected via VPN 111, it checks to see if the packet needs compression. If it does then it checks to see whether it has received the originator ID of the remote next-hop, which will be the remote CE (CE-1 in this case). The check assumes that the originator ID is of the same format as the next-hop of the route (e.g. if the next-hop is IP address 1.1.1.1 then the originator ID will be 1.1.1.1).

(8) If the CE has not received the compression label 1134-2 of the remote next-hop then it sends the packet uncompressed using the normal label stack to reach the remote CE (CE-1). If it has received the compression label, then the CE pushes on the compression label {57} 1134-2 followed by the normal CE label 1134-1 to reach the remote CE (CE-1) {26} 1134-1. Behind the compression label 1134-2 the additional cRTP tag, or originator ID 1134-3 carries the local CE's originator ID 1134-3 to identify the source of the compression as CE-2 (which may be, for example, the local loopback IP address of that CE. For illustration purposes this is 2.2.2.2 for CE-2). The label stack 1134 in this case is {26, 57} followed by {2.2.2.2}. This information is required so that the receiving CE-1 will be able to locate the cRTP context for sessions that come from this particular CE. The label stack 1134 further includes the context ID 1134-4 and payload 1134-5, as described above.

(9) The receiving PE (PE-2) receives a packet with a top label of {26} and swaps this label and forwards the packet toward PE-1. PE-1 pops the label and forwards the packet to CE-1. Thus, the packet will arrive at CE-1 with the "compression label" {57} if it was compressed, and no label if it was not. The receiving CE (CE-1) pops the {57} label, which it recognizes as the label locally allocated to indicate this is an incoming cRTP packet (the compression label 1134-2). Thus it passes the packet to the cRTP process. The cRTP process first looks at the originator ID 1134-3 to determine the originator ID and hence the source of the compression CE-2 (i.e. 1.1.1.1). At this point it can look up the cRTP context and perform normal cRTP decompression. The resulting IP packet can be forwarded normally. In the event of an error in decompression, the CE could be configured to do nothing, use the "refresh" mechanism of RFC2508 to recover, or it could use the error reporting mechanisms of RFC2508. Such a message could be IP encapsulated and sent to the originating CE, whose IP address is known since it was the originator ID. This process can readily be extended to the case where MPLS is used in the customer site. In this case the labels that would normally sit below the "CE label" in the stack, i.e. those labels that are only meaningful to routers within the customer site, can also be compressed out of the packet, along with the IP/UDP/RTP headers.

FIGS. 4-7 are a flowchart in further detail of header compression for a sequence of messages (packets). Referring to again to FIG. 1 and FIGS. 4-7, the method for transporting message packets using header compression as disclosed and claimed herein includes determining a compression label field, in which the compression label field 134-2 is indicative of the compressed nature of the header and the type of uncompression to be performed, as depicted at step 300. The compression label field 134-2 is defined by the compressor (i.e. sender) CE-1, and is recognizable by the receiver CE-4, in which the receiver is responsive to the compression label 134-2 for performing header decompression. In the exemplary configuration, the label 134-2 also employs the TTL field 134-6, not needed for LSP routing, to indicate the packet type. Applicable packet types include full header, compressed RTP, compressed UDP, context state, and others. Alternatively, different labels 134-2 may be employed to distinguish the different compression types, rather then explicit definition in the TTL field 134-6. The compression label 134-2 is therefore indicative of the ability of the sender to employ header compression, and includes defining the packet type indicator indicative of the type of header compression in packets accompanying the appended compression label. The sender then stores the packet type indicator in a preexisting field in the compressed header, such as the TTL field 134-6.

The sender CE-1 receives the label 134-2 from the destination CE-4, in which the label 134-2 is indicative of the compressed nature of the header, as shown at step 301. In effect, the compression label 134-2 is a self defined label to allow the recipient of the compressed header to recognize such headers as being compressed. Alternate configurations may even employ a static global value, however such an approach presents configuration, consistency and maintenance issues. The compression label 134-2 may also, in alternate configurations, identify a particular type of compression to be performed, as depicted at step 302. The exemplary configuration performs cRTP header compression, however alternate compression mechanism may be specified and indicated so with an alternate value in the compression label 134-2 field. Accordingly, the sender CE-1 selectively appends the compression label 134-2 based on the type of compression to be performed to the messages in the set of messages 132, in which the compression label 134-2 is indicative of the header compression performed and operable to inform the receiver of corresponding decompression to be applied, as disclosed at step 303. Therefore, the compression label 134-3 indicates the compressed nature of the header 130-H, and optionally the type of decompression to be performed, if more than one type is available.

The compression label 134-2, advertised from recipients to potential senders to enable transport of header compressed messages, typically precedes message packet transport as part of a configuration or setup phase. The sender CE-1 compresses a message header 130-H of a message 130 in a set of messages 132, in which the compression is operable for identifying deterministic fields recreatable in successive messages, as depicted at step 304. The sender CE-1 then determines a context ID indicative of the compressed message header 134 employed for indexing the header information at the receiver CE-4, as shown at step 305. Accordingly, the sender CE-1 examines the full message header 130-H of the first message 130 of the set to identify compressible header fields in a message header, as shown at step 306. The receiver, upon receiving the first message 130, associates the compressible header fields 130-H with the context ID 134-4 for subsequent indexing, discussed further below, as described at step 307.

The sender CE-1 then computes an originator ID 134-3, in which the originator ID is indicative of the originator CE-1 of the set of messages 132, as depicted at step 308. The originator ID is the IP address of the originator CE-1, and forms the compression index 120 identifying origination of the multipoint to point LSP 122-1. Individual context Ids, 134-4, being generated by the respective sender, are known to be unique to the sender, however cannot be confirmed not to collide with other context Ids of other senders (i.e. CE-2). The compression index 120, based on the originator ID 134-3, is a deterministic identifier to the compression context stored in the context table 110-1. Accordingly, computing the originator ID 134-3 further comprises determining a CE label 134-2, corresponding to the multipoint-to-point LSP 122, the originator ID 134-3 being operative to identify the source CE-1 of the multipoint-to-point LSP 122 and the determined label 134-1 operable to indicate the routing path along the multipoint-to-point LSP. For each of the successive messages in the set 132, the sender CE-1 assembles a compressed message header 134 having an originator ID 134-3, the originator ID corresponding to the sender CE-1 of the message, as shown at step 310. The compressed header 134 includes the originator ID 134-3 corresponding to each of the messages in the set, thus forming the compression index 120 for identifying the context table 110-1 containing the header fields 112-1, as shown at step 311. The sender CE-1 then appends the compression label 134-2 enabling receiver recognition of the messages as header compressed messages, to each of the messages in the set 132, as depicted at step 312.

The sender CE-1 sends each of the messages 132 via the multipoint-to-point LSP 122-1, in which the originator ID 134-3 is operable to distinguish the sender CE-1 of the message from other senders (i.e. CE-2 and others) over the multipoint-to-point LSP 122, as shown at step 313. In the exemplary configuration, employing an MPLS network, the sender CE-1 sends via a labeled path indicative of the recipient of the multipoint-to-point LSP, in which the labeled path 122-1 is operative from a predetermined protocol adapted for identifying a routing path, such as the labeled switch path (LSP) in the exemplary arrangement, as disclosed at step 314. Accordingly, CE-1 sends a first message of the set, in which the first message has the uncompressed header 130-H including the originator ID, context ID and corresponding compressed header fields 112-1, as shown at step 315. CE-1 then sends successive messages with the originator ID 134-3 and the context ID 134-4, in which the originator ID is operable as the compression index 120-1 to indicate the originator CE-1 of the message and the compression header context 110-1, as shown at step 316. Further, in the MPLS network 110, the transmission omits a destination based header field (i.e. a conventional IP destination address) from the message header, wherein the destination based header field would be operable for destination based routing such as IP routing, as shown at step 317. Accordingly, LSP routing is not constrained by a need to retain the IP destination, and can therefore transmit the entire compressed header 134 from endpoint to endpoint (e.g. CE-1 to CE-4) without intermediate decompression and recompression to examine the header fields 130-H.

Accordingly, the network 110 routes the packet based on the label field (e.g. CE label) 134-1, in which the label is indicative of particular router hops independent of the destination CE-4 (i.e. the path determines the router hops, not routing decisions based on the IP destination), as depicted at step 318. In other words, the routing employs the path label at each hop across the network, in which the path label obviates a routing lookup and enables the compressed header for transport across the entire path to the destination, as shown at step 319.

The destination PE router CE-4 first receives the message header 130-H from the message 130 indicative of the set of messages 132, in which the message header 134 has deterministic information applicable to the set of messages 132, as shown at step 320. The deterministic information is information which either does not change, or which changes in a predictable manner from packet to packet, thus enabling a deterministic mechanism to recreate the header from the sequence of messages 132 having compressed headers. The message header information is stored in the context table 110 according to the compression index (i.e. the context ID and IP address, in the exemplary configuration. Therefore, the receiving router CE-4 identifies, from the message header 130-H, a compression context 134-4 and an originator ID 134-3, forming the compression index 120, in which the originator ID remains indicative of the header information for the successive packets 132, as shown at step 321.

For each of the successive message packets 132, the receiving router CE-4 decompresses the message header 134 of the message 132 using the originator ID 134-3, in which the originator ID 134-3 is indicative of the decompression context 110-1 applicable to a set of messages 132, as depicted at step 322. Therefore, the receiving router CE-4 decompresses the message header 134 using the compression context 134-4 and the originator ID 134-3, to retrieve the header information 112-1, in which the originator ID is operable to distinguish the originator CE-1 from other originators CE-2 on the multipoint-to-point LSP 122. The compression context 110 therefore remains indicative of the deterministic information applicable to the set of messages 132 for each of the multiple originators CE-N defining endpoints of the multipoint-to-point LSP 122.

In alternate configurations, when running cRTP from CE-CE it may be desirable to compress packets that already contain an MPLS label, e.g. because the customer is segregating their traffic using hierarchical VPNs. In this case, a packet arrives at the CE already labeled, and needs to be compressed using essentially the same techniques as an unlabelled packet. Alternate configurations include an extension to cRTP [RFC2508] to compress out the MPLS header, since it will usually remain unchanged for the life of the RTP session.

Further, RFC2508, cited above, defines COMPRESSED_UDP and COMPRESSED_RTP packettypes. Because the MPLS label stack is not expected to change, these packet formats contain all the information needed to carry a compressed MPLS/IP/UDP or MPLS/IP/UDP/RTP packet respectively. The context for the cRTP session will be sufficient for the decompressor to establish that an MPLS header should be present on decompression. In the event that the MPLS label stack does change in any way (label rebinding, EXP modification, TTL change) the full header would need to be sent again.

In other alternate arrangements, when a FULL_HEADER packet is sent in cRTP to (re-)establish the shared header context with the decompressor, it normally begins with an IP (v4 or v6) header. In the case where we wish to compress the MPLS label stack we need to notify the decompressor that the packet will be MPLS encapsulated. This could be done in several ways. The particular exemplary configuration employs the TTL header field 134-6 to explicitly include a packet type indicator, as discussed above. Alternative approaches include defining a new FULL_HEADER_MPLS packet format that would be identified by a new layer 2 codepoint (as per RFC2509). This packet would be formatted just like a FULL_HEADER packet except that it would contain the complete MPLS label stack prior to the IP header.

Those skilled in the art should readily appreciate that the programs and methods for header compression operable over a multipoint-to-point LSP as defined herein are deliverable to a processing device in many forms, including but not limited to a) information permanently stored on non-writeable storage media such as ROM devices or b) information alterably stored on writeable storage media such as floppy disks, magnetic tapes, CDs, RAM devices, and other magnetic and optical media devices. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and method for header compression operable over a multipoint-to-point LSP has been particularly shown and described with references to embodiments thereof, it will be understood by those skilled in the art that various changes in form and details may be made therein without departing from the scope of the invention encompassed by the appended claims. Accordingly, the present invention is not intended to be limited except by the following claims.

What is claimed is:

1. A method for transporting message packets across a multipoint-to-point network, the method comprising:
   compressing a message header of a message in a set of messages, the messages defined as packets, the compression operable for identifying deterministic fields recreatable in successive messages;
   determining a context ID indicative of the compressed message header;
   computing a originator ID, the originator ID indicative of an originator of the set of messages on a multipoint-to-point link, the originator ID being operable to distinguish decompression context for the set of messages originating from the originator from decompression context for messages originating from other originators on the multipoint-to-point link;
   appending the context ID and the originator ID to each of the messages in the set;
   sending a first message of the set, the first message having the originator ID, context ID and corresponding uncompressed header fields; and
   sending successive messages with the originator ID and the context ID, the originator ID and context ID collectively operable to indicate the originator of the message and the compression header context,
   sending the successive messages further comprising:
      omitting a destination based header field from the message header, the destination based header field operable for destination based routing; and
      routing the packet based on a label indicative of particular router hops independent of the destination, such that the packet is not decompressed to determine routing information before the packet reaches the destination.

2. The method of claim 1 further comprising: receiving the label from a destination, the label indicative of the compressed nature of the header; and appending the label to each of the messages in the set.

3. The method of claim 2 wherein computing the originator ID further comprises determining the label, the label corresponding to the multipoint-to-point link, the determined label operable to indicate the routing path along the multipoint-to-point link.

4. The method of claim 1 further comprising inserting a compression label indicative of the compressed nature of the header, the compression label recognizable by the receiver, the receiver responsive to the compression label for performing header decompression.

5. The method of claim 4 further comprising:
   identifying a particular type of compression to be performed; and
   selectively appending a compression label based on the type of compression to be performed.

6. The method of claim 4 wherein the compression label is indicative of the ability of the sender to employ header compression, further comprising defining a packet type indicator indicative of a type of header compression in packets accompanying the appended compression label.

7. The method of claim 6 further comprising storing the packet type indicator in a preexisting field in the compressed header.

8. A method for sending messages having compressed message headers comprising:
   identifying compressible header fields in a message header; and associating the compressible header fields with a context ID;

identifying a set of messages, the set of messages adapted for header compression via a compression context;

assembling a compressed message header having an originator ID, the originator ID corresponding to a sender of a message;

sending the message via a multipoint-to-point link, the originator ID operable to distinguish the sender of the message from other senders over the multipoint-to-point link; and decompressing the message header of the message using the originator ID, the originator ID operable to distinguish decompression context for messages originating from the sender from decompression context for messages originating from other senders on the multipoint-to-point link, sending the message further comprising:

sending the message with a context ID corresponding to the compression context, the context ID and originator ID operable to distinguish the set of messages in the compression context from other messages;

omitting a destination based header field from the compressed message header, the destination based header field operable for destination based routing; and routing the message based on a label indicative of particular router hops independent of the destination, such that the message does not have to be decompressed prior to determine routing information before the message reaches the destination.

9. The method of claim 8 wherein sending further comprises sending via a labeled path indicative of the recipient of the multipoint-to-point link, the labeled path defined according to operative from a predetermined protocol adapted for identifying a routing path.

10. The method of claim 9 where the multipoint-to-point link is a label switched path (LSP) indicative of intermediate routing hops through the network.

11. A method of compressing message headers over a multipoint-to-point link comprising:

identifying a set of messages adaptable for header compression, adaptable messages having headers with deterministic information predictable from a predecessor message from the set of messages;

associating the deterministic information with a context ID, the context ID indicative of the header information for each of the messages in the set of messages;

appending the context ID to each of the messages in the set of messages;

inserting an originator identifier, indicative of the sender of the message, in a message header having the context ID, the combination of the originator identifier and the context ID operable to distinguish decompression context for messages originating from the sender from decompression context for messages originating from other senders on the multipoint-to-point link;

omitting a destination based header field from the message header, the destination based header field operable for destination based routing; and routing the packet based on a label the label indicative of particular router hops independent of the destination, such that the packet does not have to be decompressed prior to determine routing information before the packet reaches the destination, wherein the sender is a first sender, the method further comprising a second sender operable to access the multipoint-to-point link, the second sender having a second set of messages adapted for header compression via the multipoint-to-point link, and identifying compressible header fields of the second set of messages;

building a header corresponding to the second set of messages;

computing a context ID indicative of the compressed header information; and determining an originator ID indicative of the second sender, wherein the context ID and the originator ID are different from the context ID and originator ID of the set of messages sent by the first sender.

12. The method of claim 11 further comprising:

computing a compression label field, the compression label field indicative of the compressed nature of the header and the type of uncompression to be performed; and appending the compression label field to the messages in the set of messages, the compression label indicative of the header compression performed and operable to inform the receiver of corresponding decompression to be applied.

13. The method of claim 11 wherein the compression label is indicative of the ability of the sender to employ header compression, further comprising defining a packet type indicator indicative of a type of header compression in packets accompanying the appended compression label.

14. The method of claim 11 further comprising:

omitting a destination based header field, the destination based header field operable in conjunction with a routing table for computing a sequence of hops via table lookup;

appending a path label indicative of at least one specific router, the path label operable to define the path through the network to the destination; and employing the path label at each hop across the network, the path label obviating a routing lookup and enabling the compressed header for transport across the entire path to the destination.

15. A method of receiving header compressed messages over a multipoint-to-point link comprising:

receiving a message header indicative of a set of messages, the set of messages defined as packets and adapted for header compression via a compression context, the message header having deterministic information applicable to the set of messages;

identifying, from the message header, a context ID corresponding to the compression context and an originator ID, the compression context and originator ID indicative of the header information, the context ID and originator ID operable to distinguish the set of messages in the compression context from other messages;

omitting a destination based header field from the message header, the destination based header field operable for destination based routing;

routing the packet based on a label, the label indicative of particular router hops independent of the destination, such that the packet does not have to be decompressed prior to determine routing information before the packet reaches the destination; and decompressing the message header using the compression context and the originator ID to retrieve the header information, the originator ID operable to distinguish decompression context for messages originating from an originator from decompression context for messages originating from other originators on the multipoint-to-point link, the compression context indicative of the deterministic information applicable to the set of messages.

16. The method of claim 15 further comprising:
receiving a compression label field, the compression label field indicative of the compressed nature of the header and the type of uncompression to be performed; and
identifying, from the compression label field in received compressed headers, a compression label indicative of the compressed nature of the header and the type of uncompression to be performed.

17. A data communications device for transporting message packets comprising:
a processor operable to execute instructions;
a network interface responsive to the processor for performing the instructions,
a memory coupled to the processor operable to store encoded instructions executable by the processor, the encoded instructions operable for:
compressing a message header of a message in a set of messages, the messages defined as packets, the compression operable for identifying deterministic fields recreatable in successive messages;
determining a context ID indicative of the compressed message header;
computing a originator ID, the originator ID indicative of the originator of the set of messages;
appending the context ID and the originator ID to each of the messages in the set;
sending a first message of the set, the first message having the originator ID, context ID and corresponding uncompressed header fields; and
sending successive messages with the originator ID and the context ID, the originator ID and context ID collectively operable to indicate the originator of the message and the compression header context, sending the successive messages further comprising:
omitting a destination based header field from the message header, the destination based header field operable for destination based routing; and
routing the packet based on a label indicative of particular router hops independent of the destination, such that the packet does not have to be decompressed to determine routing information before the packet reaches the destination,
wherein the processor is further operable to compute the originator ID by determining a label corresponding to a multipoint-to-point link, the originator ID operative to identify a source of the multipoint-to-point link and the determined label operable to indicate the routing path along the multipoint-to-point link.

18. The data communications device of claim 17 wherein:
the interface is operable to receive a label from a destination, the label indicative of the compressed nature of the header; and
the processor is operable to append the label to each of the messages in the set.

19. The data communications device of claim 17 wherein the memory further comprises instructions for:
omitting a destination based header field from the message header, the destination based header field operable for destination based routing; and
routing the packet based on a label field, the label indicative of particular router hops independent of the destination.

20. The method of claim 17 where the multipoint-to-point link is a label switched path (LSP) having a label operative indicative of intermediate routing hops through the network.

21. A computer program product having a computer readable storage medium operable to store computer program logic embodied in computer program code that, when executed by a processor, perform a method for sending messages having compressed message headers comprising:
identifying compressible header fields in a message header; and associating the compressible header fields with a context ID;
identifying a set of messages, the set of messages adapted for header compression via a compression context;
assembling a compressed message header having an originator ID, the originator ID corresponding to the sender of the message;
sending the message via a multipoint to point link, the originator ID operable to distinguish decompression context for the set of messages originating from the sender from decompression context for messages originating from other senders on the multipoint-to-point link, sending occurring via a labeled path indicative of the recipient of the multipoint-to-point link, the labeled path defined according to a predetermined protocol adapted for identifying a routing path, sending the message further comprising:
sending the message with a context ID corresponding to the compression context, the context ID and originator ID operable to distinguish the set of messages in the compression context from other messages;
omitting a destination based header field from the compressed message header, the destination based header field operable for destination based routing; and
routing the packet based on a label indicative of particular router hops on the identified routing path independent of the destination, such that the packet does not have to be decompressed prior to determine routing information before the packet reaches the destination; and
computer program code for decompressing the message header of the message using the originator ID, the originator ID indicative of a decompression context applicable to a set of messages.

22. A method for header compression in a label switched path (LSP) network comprising:
receiving a message in a set of messages, the message being a Real Time Protocol message that includes an multi protocol label switching label;
compressing a message header of the message in the set of messages, the compression applied to deterministic fields recreatable in successive messages, to generate a compressed message header;
determining a context ID indicative of the compressed message header; computing an originator ID, the originator ID indicative of an originator of the set of messages and operable to distinguish decompression context for messages originating from the originator from decompression context for messages originating from other originators on the multipoint-to-point link;
appending the context ID and the originator ID to each of the messages in the set;
computing a predetermined label switched path (LSP), the LSP defining a path through the network; and
transmitting each message in the set of messages on the computed LSP independently of routing information in the compressed header fields, the LSP routing avoiding intermediate decompression to identify the destination, transmitting via the LSP further including
sending a first message of the set, the first message having the originator ID, context ID and corresponding uncompressed header fields; and
sending successive messages with the originator ID and the context ID, the originator ID and context ID collectively operable to indicate the originator of the message and the compression header context such that the uncompressed header fields are omitted, sending successive messages further comprising omitting a destination based header from the message header, the destination based header field operable of destination based routing.

23. The method of claim 22 further comprising computing a compression label for distinguishing each message in the set of messages as an LSP message employing compression, and transmitting each message with the computed compression label.

* * * * *

UNITED STATES PATENT AND TRADEMARK OFFICE
CERTIFICATE OF CORRECTION

| | |
|---|---|
| PATENT NO. | : 7,602,778 B2 |
| APPLICATION NO. | : 11/169417 |
| DATED | : October 13, 2009 |
| INVENTOR(S) | : James N. Guichard et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 820 days.

In column 16, claim 15, line 56, after "prior to" replace "determine" with --determining--.

Signed and Sealed this

Nineteenth Day of October, 2010

David J. Kappos
*Director of the United States Patent and Trademark Office*